US008446421B2

(12) United States Patent
Low et al.

(10) Patent No.: US 8,446,421 B2
(45) Date of Patent: May 21, 2013

(54) ALLOCATION AND EFFICIENT USE OF DISPLAY MEMORY BANDWIDTH

(75) Inventors: Yun Shon Low, Richmond (CA); Eric Jeffrey, Richmond (CA)

(73) Assignee: Seiko Epson Corporation, Tokyo (JP)

( * ) Notice: Subject to any disclaimer, the term of this patent is extended or adjusted under 35 U.S.C. 154(b) by 1062 days.

(21) Appl. No.: 12/429,593

(22) Filed: Apr. 24, 2009

(65) Prior Publication Data

US 2010/0271380 A1 Oct. 28, 2010

(51) Int. Cl.
*G06F 13/00* (2006.01)

(52) U.S. Cl.
USPC ............................ 345/536; 345/545; 345/558

(58) Field of Classification Search
USPC ................................................ 345/536, 558
See application file for complete search history.

(56) References Cited

U.S. PATENT DOCUMENTS 5,444,457 A 8/1995 Hotto
5,627,558 A 5/1997 Hotto
5,831,588 A 11/1998 Hotto
6,335,728 B1 * 1/2002 Kida et al. .................... 345/204
7,287,106 B2 * 10/2007 Wu ................................ 710/57
2003/0038807 A1 * 2/2003 Demos et al. ................. 345/473
2003/0076886 A1 * 4/2003 Nagata et al. ............ 375/240.25
2005/0155072 A1 * 7/2005 Kaczowka et al. ............. 725/95
2006/0044328 A1 * 3/2006 Rai et al. ....................... 345/629
2008/0055327 A1 * 3/2008 Rai et al. ....................... 345/558
2008/0192060 A1 * 8/2008 Ogiso ........................... 345/546

* cited by examiner

*Primary Examiner* — Ke Xiao
*Assistant Examiner* — Kim-Thanh T Tran

(57) ABSTRACT

A method includes fetching first synthesized pixels from an update buffer of a memory and fetching data pixels from an image buffer of the memory during the first drive frame period. Respective data pixels are fetched synchronously with the fetching of corresponding first synthesized pixels. Respective data pixels fetched from the image buffer are synthesized with corresponding first synthesized pixels to generate second synthesized pixels. The second synthesized pixels are stored in the update buffer during the first drive frame period. The storing of second synthesized pixels may be paused based on a prediction that the fetching of first synthesized pixels will not complete within the first drive frame period. The fetching of data pixels from the image buffer of the memory may also be paused based on the prediction that the fetching of first synthesized pixels will not complete within the first drive frame period.

20 Claims, 13 Drawing Sheets

ALLOCATION AND EFFICIENT USE OF DISPLAY MEMORY BANDWIDTH

TECHNICAL FIELD

This application relates to driving or updating active-matrix, electro-optic display devices with display pixels having multiple stable display states.

BACKGROUND

An electro-optic material has at least two "display states," the states differing in at least one optical property. An electro-optic material may be changed from one state to another by applying an electric field across the material. The optical property may or may not be perceptible to the human eye, and may include optical transmission, reflectance, or luminescence. For example, the optical property may be a perceptible color or shade of gray.

Electro-optic displays include the rotating bichromal member, electrochromic medium, electro-wetting, and particle-based electrophoretic types. Electrophoretic display ("EPD") devices, sometimes referred to as "electronic paper" devices, may employ one of several different types of electro-optic technologies. Particle-based electrophoretic media include a fluid, which may be either a liquid, or a gaseous fluid. Various types of particle-based EPD devices include those using encapsulated electrophoretic, polymer-dispersed electrophoretic, and microcellular media. Another electro-optic display type similar to EPDs is the dielectrophoretic display.

Generally, an image is formed on an electro-optic display device by individually controlling the display states of a large number of small individual picture elements or display pixels. A data pixel having one or more bits defines a particular display state of a display pixel. A frame of data pixels defines an image. Commonly, the display pixels are arranged in rows and columns forming a display matrix. An exemplary electro-optic display pixel includes a layer of electro-optic material situated between a common electrode and a pixel electrode. One of the electrodes, typically the common electrode, may be transparent. The common and pixel electrodes together form a parallel plate capacitor at each display pixel, and when a potential difference exists between the electrodes, the electro-optic material situated in between the electrodes experiences the resulting electric field.

An active-matrix display includes at least one non-linear circuit element, such as a transistor, for each display pixel. An exemplary active-matrix display pixel includes a thin-film transistor having its drain terminal coupled with the pixel electrode. The gate and source terminals of the transistor are respectively coupled with a row select line and a column data line. To change the display state of the display pixel, the common electrode is placed at ground or some other suitable voltage and a row driver circuit turns on the transistor by driving a suitable voltage on the row select line. An optical-property-dependent voltage corresponding with a display state transition may then be driven on the column data line by a column driver circuit.

An electro-optic display device may have display pixels that have multiple stable display states. Display devices in this category are capable of displaying (a) multiple display states, and (b) the display states are considered stable. With respect to (a), display devices having multiple stable display states include electro-optic displays that may be referred to in the art as "bistable." The display pixels of a bistable display have first and second stable display states. The first and second display states differ in at least one optical property, such as a perceptible color or shade of gray. For example, in the first display state, the display pixel may appear black and in the second display state, the display pixel may appear white. In addition, display devices having multiple stable display states include devices having display pixels that have three or more stable display states. Each of the multiple display states differ in at least one optical property, e.g., light, medium, and dark shades of a particular color. As another example, a display device having multiple stable states may have display pixels having display states corresponding with 4, 8, 16, 32, or 64 different shades of gray.

With respect to (b), the multiple display states of a display device may be considered to be stable, according to one definition, if the persistence of the display state with respect to display pixel drive time is sufficiently large. The display state of a display pixel may be changed by driving a drive pulse (typically a voltage pulse) on the column data line of the display pixel until the desired appearance is obtained. Alternatively, the display state of a display pixel may be changed by driving the column data line over time with a series of drive pulses regularly spaced in time. In either case, the display pixel exhibits a new display state at the conclusion of the drive time. If the new display state persists for at least several times the minimum duration of the drive time, the new display state may be considered stable. Generally, in the art, the display states of display pixels of LCDs and CRTs are not considered to be stable.

A display memory may be employed in display update or display refresh operations of an electro-optic display device with display pixels having multiple stable display states. The display memory generally has a limited amount of available memory bandwidth. At certain times the demands for access to the display memory may exceed available memory bandwidth. It would be desirable to allocate the available memory bandwidth so that important operations can be timely completed. In addition, it would be desirable to increase the efficiency of use the available display memory bandwidth.

Accordingly, there is a need for methods and apparatus for allocating and efficiently using available display memory bandwidth.

SUMMARY OF DISCLOSURE

One embodiment is directed to a method. The method includes fetching first synthesized pixels from an update buffer of a memory during a first drive frame period. The method also includes fetching data pixels from an image buffer of the memory during the first drive frame period. Respective data pixels are fetched synchronously with the fetching of corresponding first synthesized pixels. In addition, the method includes synthesizing respective data pixels fetched from the image buffer with corresponding first synthesized pixels to generate second synthesized pixels, and storing the second synthesized pixels in the update buffer during the first drive frame period. Further, the method includes pausing the storing of second synthesized pixels based on a prediction that the fetching of first synthesized pixels will not complete within the first drive frame period. In one embodiment, the method includes pausing the fetching of data pixels from the image buffer of the memory based on the prediction that the fetching of first synthesized pixels will not complete within the first drive frame period.

One embodiment is directed to a display controller. The display controller may include a memory, and the memory may include an image buffer and an update buffer. The display controller includes a display pipeline sequencer to fetch first synthesized pixels from the update buffer of the memory during a first drive frame period and a pixel synthesizer. The pixel synthesizer fetches data pixels from the image buffer of the memory. Respective data pixels are fetched synchronously with the fetching of corresponding first synthesized pixels. In addition, the pixel synthesizer synthesizes respective data pixels fetched from the image buffer with corresponding first synthesized pixels to generate second synthesized pixels, and stores the second synthesized pixels in the update buffer. The display controller also includes a unit to pause the fetching of data pixels from the image buffer of the memory based on a prediction that the fetching of first synthesized pixels will not complete within the drive frame period. In one embodiment, the unit is pauses the storing of the second synthesized pixels in the update buffer based on a prediction that the fetching of first synthesized pixels will not complete within the drive frame period.

DETAILED DESCRIPTION

In the following detailed description of exemplary embodiments, reference is made to the accompanying drawings, which form a part hereof. In the several figures, like referenced numerals identify like elements. The detailed description and the drawings illustrate exemplary embodiments. Other embodiments may be utilized, and other changes may be made, without departing from the spirit or scope of the subject matter presented here. The following detailed description is therefore not to be taken in a limiting sense, and the scope of the claimed subject matter is defined by the appended claims.

Figure 1:
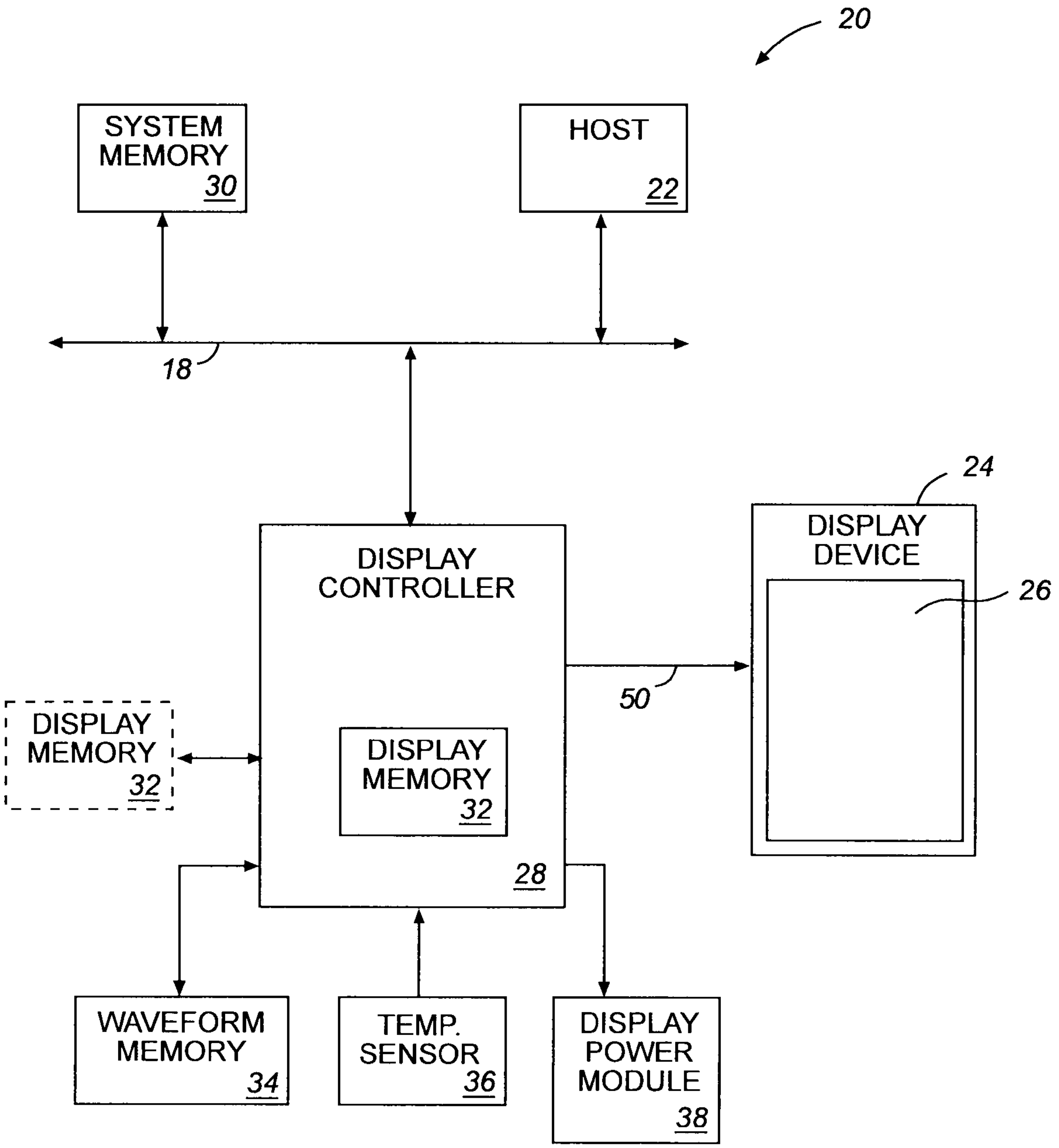
FIG. 1 is a block diagram of an exemplary display system having a display device, a display controller, and display memory.

FIG. 1 illustrates a block diagram of an exemplary display system 20 illustrating one context in which embodiments may be implemented. The system 20 includes a host 22, a display device 24 having a display matrix 26, a display controller 28, and a system memory 30. The system 20 also includes a display memory 32, a waveform memory 34, a temperature sensor 36, and a display power module 38. In addition, the system 20 includes a first bus 18, a bus 50, as well as the shown buses interconnecting system components. The system 20 may be any digital system or appliance. In one embodiment, the system 20 is a battery powered (not shown) portable appliance, such as an electronic reader. FIG. 1 shows only those aspects of the system 20 believed to be helpful for understanding the disclosed embodiments, numerous other aspects having been omitted.

The host 22 may be a general purpose microprocessor, digital signal processor, controller, computer, or any other type of device, circuit, or logic that executes instructions of any computer-readable type to perform operations. Any type of device that can function as a host or master is contemplated as being within the scope of the embodiments.

In one embodiment, the display device 24 may be an electro-optic display device with display pixels having multiple stable display states in which individual display pixels may be driven from a current display state to a new display state by series of two or more drive pulses. In one alternative, the display device 24 may be an electro-optic display device with display pixels having multiple stable display states in which individual display pixels may be driven from a current display state to a new display state by a single drive pulse. The display device 24 may be an active-matrix display device. In one embodiment, the display device 24 may be an active-matrix, particle-based electrophoretic display device having display pixels that includes one or more types of electrically-charged particles suspended in a fluid, the optical appearance of the display pixels being changeable by applying an electric field across the display pixel causing particle movement through the fluid.

In one embodiment, the display controller 28 may be disposed on an integrated circuit ("IC") separate from other elements of the system 20. In an alternative embodiment, the display controller 28 need not be embodied in a separate IC. In one embodiment, the display controller 28 may be integrated into one or more other elements of the system 20. The display controller 28 is further described below.

The system memory 30 may be may be an SRAM, VRAM, SGRAM, DDRDRAM, SDRAM, DRAM, flash, hard disk, or any other suitable memory. The system memory may store instructions that the host 22 may read and execute to perform operations. The system memory may also store data.

The display memory 32 may be an SRAM, VRAM, SGRAM, DDRDRAM, SDRAM, DRAM, flash, hard disk, or any other suitable memory. The display memory 32 may be a separate memory unit (shown in dashed lines), such as a separate IC, or it may be a memory embedded in the display controller 28, as shown in FIG. 1. In one alternative, the display memory 32 may be a combination of a separate memory and an embedded memory. The display memory 32 may be employed to store one frame of pixel data and one frame of synthesized pixel data. In one embodiment, the display memory 32 may store data or instructions.

The waveform memory 34 may be a flash memory, EPROM, EEPROM, or any other suitable non-volatile memory. The waveform memory 34 may store one or more different drive schemes, each drive scheme including one or more waveforms used for driving a display pixel to a new display state. The waveform memory 34 may include a different set of waveforms for one or more update modes. The waveform memory 34 may include waveforms suitable for use at one or more temperatures. The waveform memory 34 may be coupled with the display controller 28 via a serial or parallel bus. In one embodiment, the waveform memory 34 may store data or instructions.

The drive pulse (or more typically, the series of drive pulses) required to change the display state of a display pixel to a new display state depends on temperature and other factors. To determine temperature, the temperature sensor 36 is provided. The temperature sensor 36 may be a digital temperature sensor with an integrated Sigma Delta analog-to-digital converter or any other suitable digital temperature sensor. In one embodiment, the temperature sensor 36 includes an $I^2C$ interface and is coupled with the display controller 28 via the $I^2C$ interface. The temperature sensor 36 may be mounted in a location suitable for obtaining temperature measurements that approximate the actual temperatures of the display pixels of the display device 24. The temperature sensor 36 may be coupled with the display controller 28 in order to provide temperature data that may be used in selecting a display pixel drive scheme.

The power module 38 is coupled with the display controller 28 and the display device 24. The power management unit 38 may be a separate IC. The power module 38 receives control signals from the display controller 28 and generates an appropriate voltage (or current) to drive selected display pixels of the display device. In one embodiment, the power management unit 38 may generate voltages of +15V, −15V, or 0V. When drive pulses are not needed, the power module 38 may be powered down or placed in a standby mode.

Figure 2:
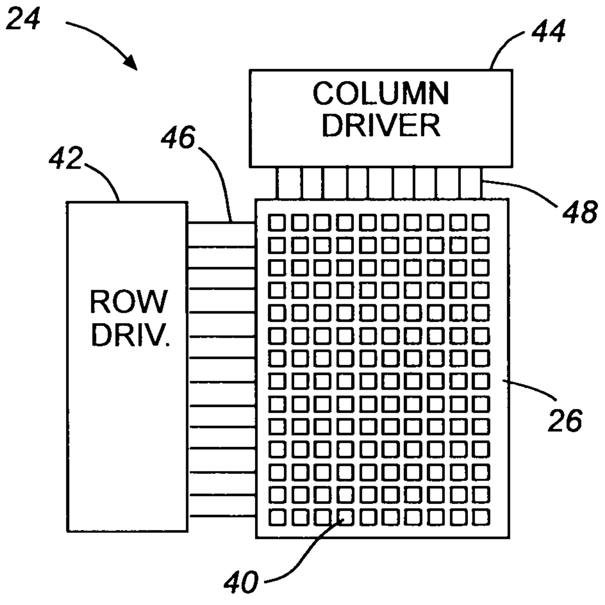
FIG. 2 is a schematic view of the display device of FIG. 1, the display device having a display matrix.

FIG. 2 shows a schematic view of the display device 24. An image may be formed on the display device 24 by individually controlling the display states of a large number of small individual picture elements ("display pixels") 40. The display device 24 includes a display matrix 26 of display pixels 40. In one embodiment, each display pixel 40 includes an active switching element (not shown in FIG. 2), such as a thin-film transistor. The switching elements are selected and driven by row driver 42 and a column driver 44. In operation, the row driver 42 may select one of the row select lines 46, turning on all of the switching elements in the row. The column driver 44 may provide a drive pulse on one or more selected column data lines 48, thereby providing a drive pulse to the display pixel located at the intersection of selected row and column lines.

The display device 24 may be coupled with the display controller 28 via one or more buses 50 that the display controller uses to provide pixel data and control signals to the display. The display state of a display pixel 40 is defined by one or more bits of data, which may be referred to as a "data pixel." An image is defined by data pixels and may be referred to as a "frame." Commonly, the display pixels are arranged in rows and columns forming a matrix ("display matrix") 26. There is a one-to-one correspondence between data pixels of a frame and the display pixels 40 of a corresponding display matrix 26.

Figure 3:
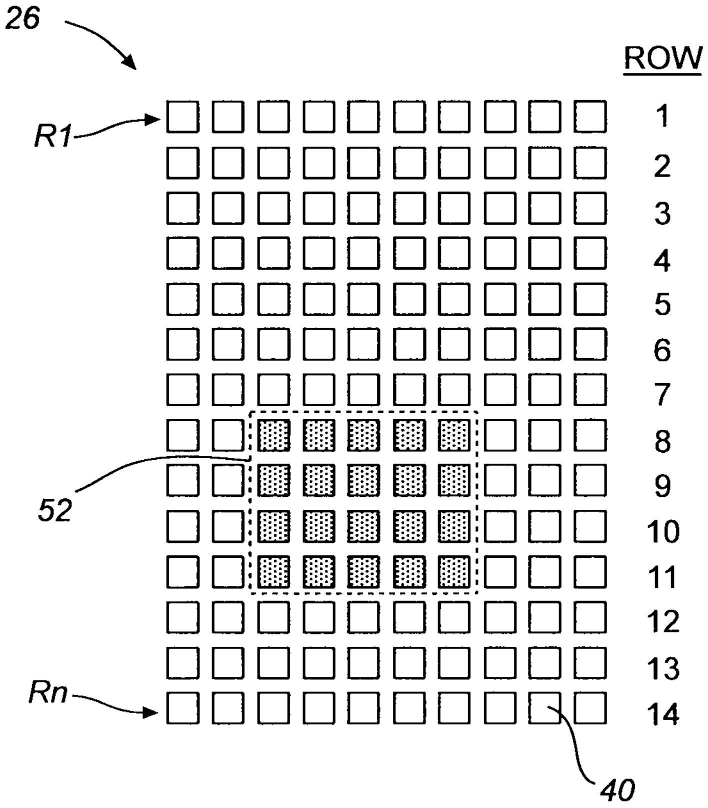
FIG. 3 is a schematic view of the exemplary display matrix of FIG. 2, the display matrix having display pixels.

FIG. 3 shows a schematic view of an exemplary display matrix 26 of display pixels 40. The display device 24 includes a display matrix 26 of display pixels 40 for displaying a frame of pixel data. The display matrix 26 may include any number of rows and columns of display pixels. As one example, the display matrix includes 480 rows and 640 columns. The display matrix 26 includes a first row R1. The display matrix 26 may include one or more submatrices 52. The display submatrix 52 may be used in this description to refer to a region of the display matrix 26 that is refreshed or updated in a partial display update operation. Each of the one or more submatrices 52 includes one or more display pixels that are to be refreshed or updated to a new display state. In one embodiment, the display submatrix 52 defines a pop-up menu. In another embodiment, the display submatrix 52 defines a cursor. In another embodiment, the display submatrix 52 defines a dialog box.

The display pixels 40 of the display matrix 26 of the display device 24 may have multiple stable states. In one embodiment, the display device 24 is a display device having display pixels 40 having three or more stable display states, each display state differing in at least one optical property. In one alternative embodiment, the display device 24 is a bistable display device having display pixels 40 which have first and second stable display states, each state differing from the other in at least one optical property. The display state of a display pixel 40 may be persistent with respect to drive time. In one embodiment, the display state of a display pixel 40 persists for at least two or three times the minimum duration of the drive time. In addition, in one embodiment, the voltage pulse required to change the display state of a display pixel 40 from a current display state to a new display state strongly depends on the current display state.

In one embodiment, the display device 24 includes a layer of electro-optic material situated between a common electrode and a pixel electrode. One of the electrodes, typically the common electrode, may be transparent. The common and pixel electrodes together form a parallel plate capacitor, and when a potential difference exists between the electrodes, the electro-optic material situated in between the electrodes experiences the resulting electric field. This general arrangement may be in the form of one parallel plate capacitor at each display pixel, or more than one parallel plate capacitor at each display pixel.

Figure 4:
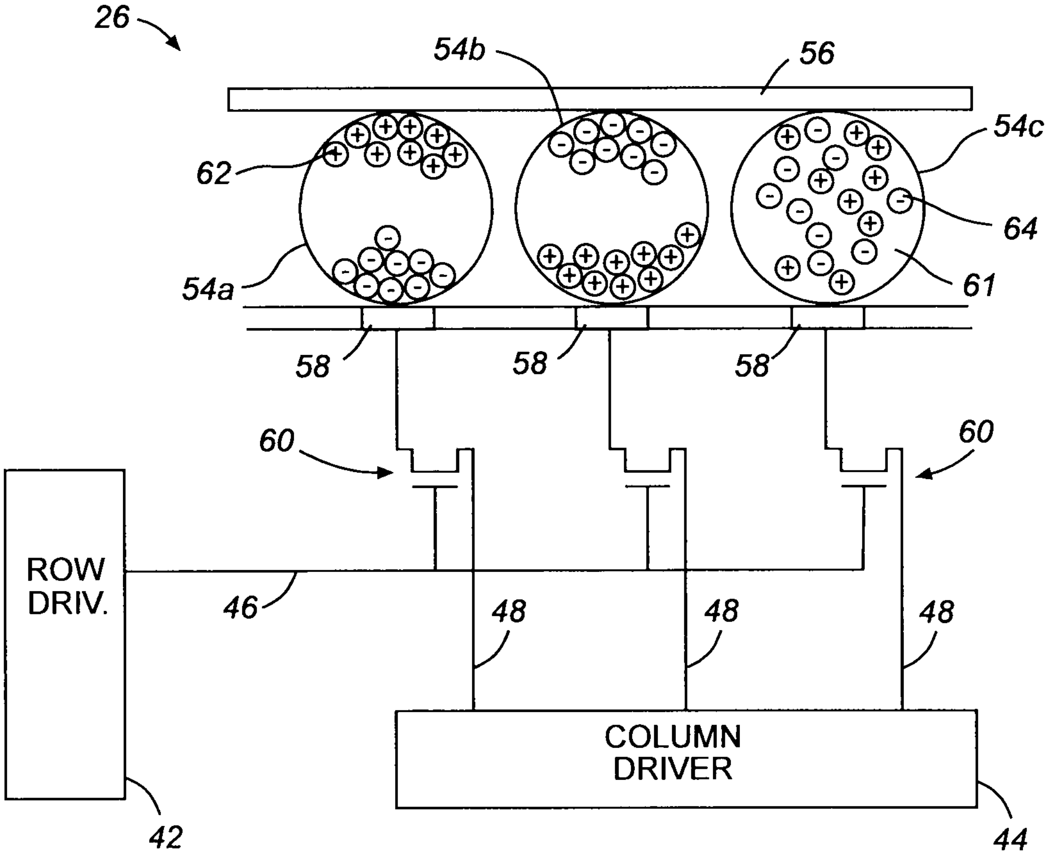
FIG. 4 is a diagram illustrating electrophoretic media disposed between electrodes in an active-matrix arrangement forming one or more display pixels.

FIG. 4 is a diagram illustrating one exemplary arrangement of one type of electrophoretic media disposed between a common electrode and a pixel electrode, one type of nonlinear circuit element of an active-matrix, and row and column driving circuits. FIG. 4 includes a simplified representation of a portion of the exemplary electrophoretic display 26 in cross-section, a schematic diagram of a portion of the associated nonlinear circuit elements, and a block diagram of row and column driving circuits 42, 44. Referring to FIG. 4, one or more microcapsules 54 are sandwiched between common electrode 56 and pixel electrode 58. The common electrode 56 may be transparent. The drain terminal of a thin-film transistor 60 is coupled with the pixel electrode 58. The gate terminals of the thin-film transistors 60 are coupled with the row driver 42 via row select line 46. The source terminal of each thin-film transistor 60 is coupled with column driver 44 via the column data line 48. Each display pixel may correspond with one microcapsule 54 as shown in FIG. 4, or may correspond with two or more microcapsules (not shown). Each microcapsule 54 may include positively charged white particles 62 and negatively charged black particles 64 suspended in a fluid 61.

To change the display state of a display pixel 40, the common electrode 56 is placed at ground or some other suitable voltage and the row driver circuit 42 turns on all of the transistors 60 in one of the rows by driving a suitable voltage on the row select line 46. The column driver circuit 44 then drives a drive pulse on the column data lines 48 of data pixels having their display state changed. As charge builds up on the common and pixel electrodes 56, 58 an electric field is established across the microcapsule(s) 54 associated with a particular display pixel. When the electric field is positive, the white particles 62 move toward the electrode 56, which results in the display pixel becoming whiter in appearance. On the other hand, when the electric field is negative, the black particles 64 move toward the electrode 56, which results in the display pixel becoming blacker in appearance. The microcapsule 54*a* is a simplified representation of a display pixel that is completely white and the microcapsule 54*b* is a simplified representation of a display pixel that is completely black. In addition, the microcapsule 54*c* illustrates a display pixel having a gray-scale value other than completely white or black, i.e., gray.

So long as charge is stored on the common and pixel electrodes 56, 58 there will be an electric field across the display pixel causing particle movement through the fluid. It will be appreciated that even after the row driver circuit 42 turns a transistor 60 off, or the column driver circuit 44 stops driving a drive pulse on the column data line 48, charge may remain on the common and pixel electrodes 56, 58, i.e., the field does not instantly collapse. In addition, particles 62, 64 may have momentum. Accordingly, particle movement through the fluid may continue for some time after a display pixel has been driven.

While the display state of a display pixel may be changed by having the column driver apply and hold an appropriate drive pulse on the column data line 48 until the desired display state is obtained in a single time interval, alternative methods may be employed for changing the display state of a display pixel. Various alternative methods provide for driving a series of drive pulses over time. In these methods, the display matrix 26 is refreshed or updated in a series of two or more "drive frames." For each drive frame in the series, each row is selected once, allowing the column driver 44 to drive a drive pulse onto each display pixel of the selected row having its display state changed. The duration of time that each row is selected may be identical so that each drive frame in the series is of identical duration. Thus, instead of changing the display state of a display pixel with a single drive pulse in a single time period, the display state may be changed by driving a series of drive pulses in a series of time periods regularly spaced in time.

Figure 5:
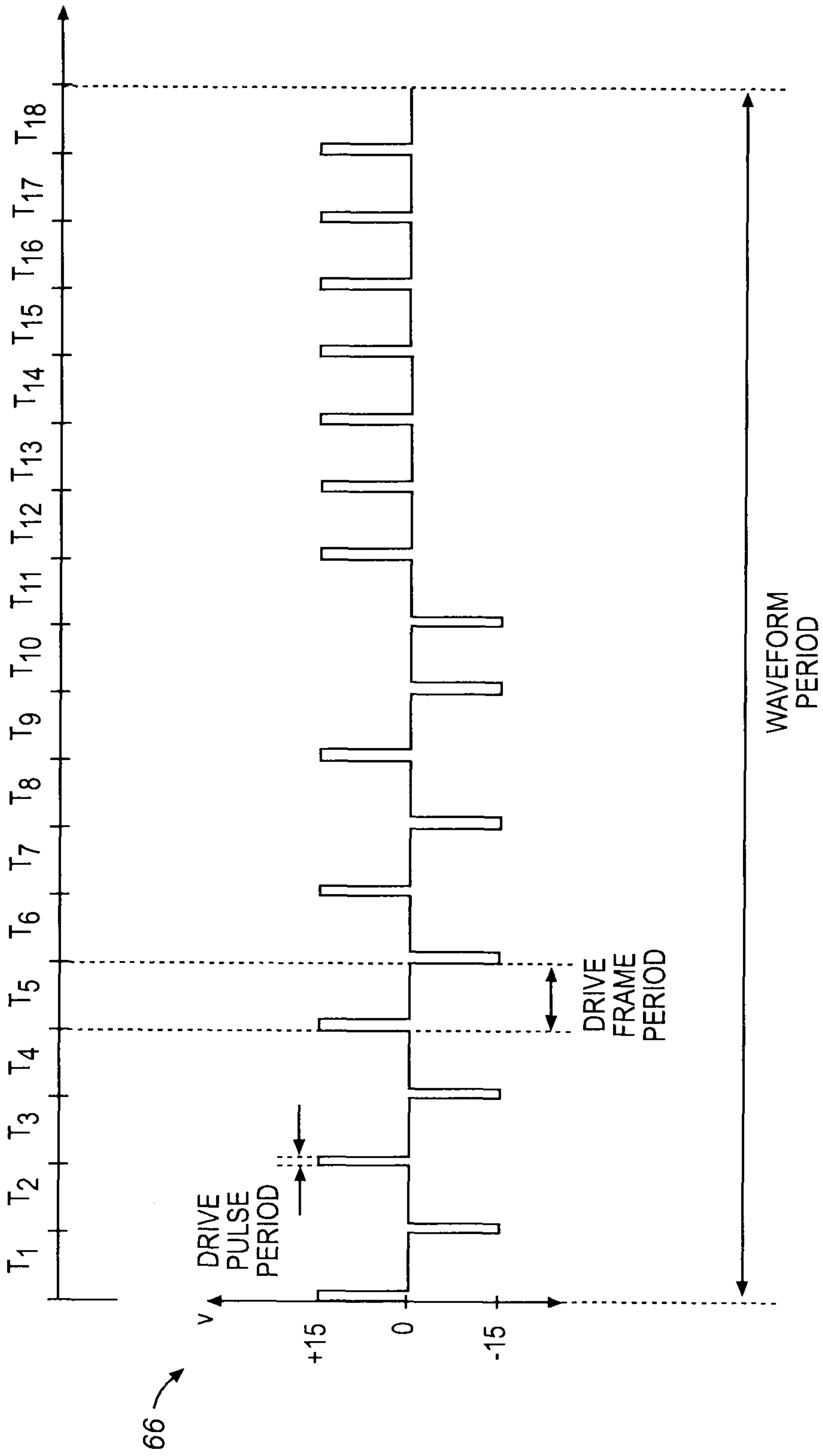
FIG. 5 is a timing diagram of an exemplary waveform used to change a display state of a display pixel.

FIG. 5 shows an exemplary waveform 66. The term "waveform" may be used in this description to denote the entire series of drive pulses occurring in a series of time periods regularly spaced in time that are used to cause a transition from some initial display state to a final display state. A waveform may include one or more "pulses" or "drive pulses," where a pulse or a drive pulse generally refers to the integral of voltage with respect to time, but may refer to the integral of current with respect to time. The term "drive scheme" may be used in this description to refer to a set of waveforms sufficient to effect all possible transitions between display states for a specific display device under particular environmental conditions.

The waveform 66 is provided for the purpose of illustrating features of waveforms generally and for defining terms. The waveform 66 is not intended to depict an actual waveform. The time periods shown in FIG. 5 are not intended to be to scale. The time period in which a single drive pulse is driven may be referred to as the "drive pulse period." In one embodiment, the drive pulse periods are of identical duration. The time period in which all of the lines of a display matrix 26 are addressed once may be referred to as the "drive frame period." In one embodiment, each drive frame period is of identical duration. The time associated with the entire series of drive frame periods may be referred to as the "waveform period." The "drive time" of a display pixel 40 may be equal to a waveform period.

The display device 24 may make use of multiple drive schemes. For example, the display device 24 may use a gray scale drive scheme ("GSDS"), which can be used to cause transitions between all possible gray levels. In addition, display device 24 may use a monochrome drive scheme ("MDS"), which can be used to cause transitions only between two gray levels, e.g., black or white. Further, the display device 24 may use a pen update mode ("PU"), which can be used to cause transitions having an initial state that includes all possible gray levels and a final state of either black or white. The MDS and PU drive schemes typically provide quicker rewriting of the display than the GSDS drive scheme. A drive scheme may be selected based on the type of display state transitions that are needed. For instance, if display pixels may take any one of 16 gray levels and the region being updated includes display pixels transitioning from 10 to 15, then the GSDS drive scheme must be used. However, if the region being updated includes display pixels transitioning from 10 to 0, or 10 to 15, then either the GSDS or PU drive schemes may be used. Because the PU drive scheme is faster than the GSDS drive scheme, the PU drive scheme would generally be used. In alternative embodiments, any number of display states may be provided, e.g., 2, 4, 8, 32, 64, 256, etc.

Figure 6:
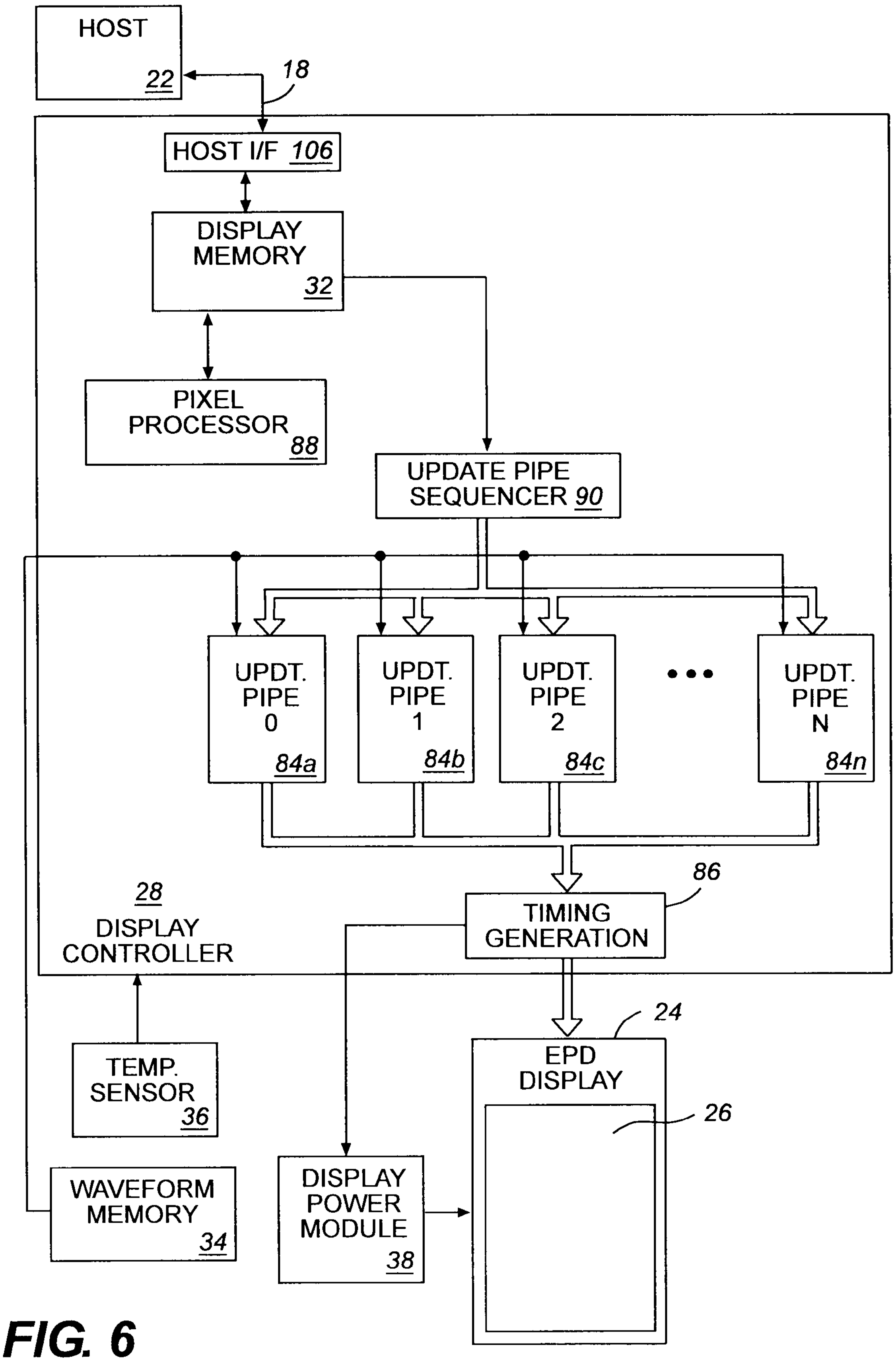
FIG. 6 is a block diagram of the display controller and display memory of FIG. 1 according to one embodiment.

FIG. 6 shows the display controller 28 and display memory 32 in greater detail. The display controller 28 may include one or more update pipes 84, a timing generation unit 86, and a host interface 106. In addition, the display controller 28 may include a pixel processor 88 and an update pipe sequencer 90. The display memory 32 may be coupled with the host 22 via the host interface 106. In addition, the display memory 32 may be coupled with pixel processor 88 and the update pipe sequencer 90.

Use of the display controller 28 permits the image displayed on a bistable, electro-optic display device to be divided into two or more regions and each of the regions may be updated in separate display update operations. Each display update operation may use a different drive scheme or update mode, and the display update operations may overlap in time. The updating of a first region of the display matrix using a first update mode can begin even while a display update operation for updating a second region using a second update mode is in progress.

Figure 7:
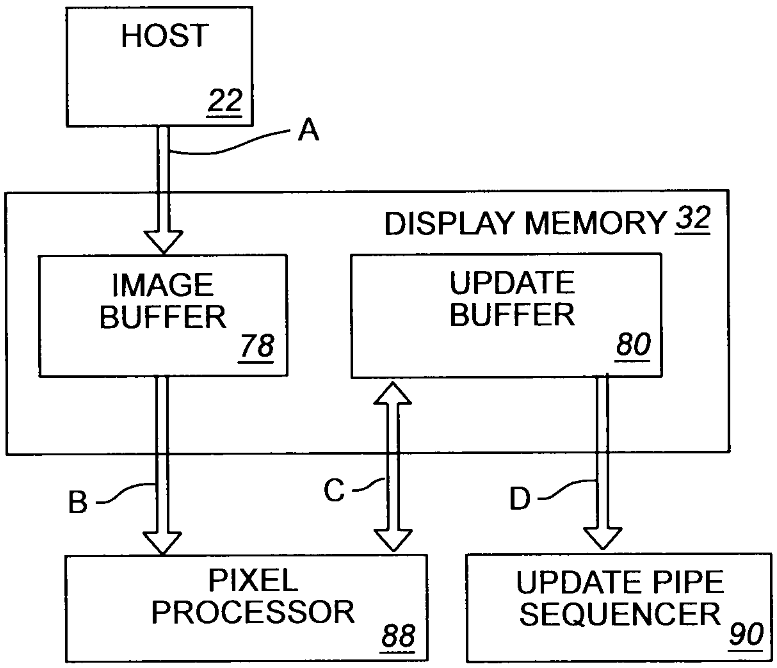
FIG. 7 is a block diagram showing the display memory of FIG. 1 and exemplary data paths according to one embodiment.

FIG. 7 is a block diagram showing the display memory 32, according to one embodiment, in greater detail, and exemplary data paths between the display memory 32 and the host 22, the pixel processor 88, and update pipe sequencer 90. In one embodiment, the display memory 32 includes an image buffer 78 and an update buffer 80. The host 22 may write to the image buffer 78 via data path "A." (Although not shown in FIG. 7, the host 22 may also read from the display memory 32.) In a pixel synthesis operation, the pixel processor 88 may read from the image buffer 78 via data path "B." In addition, the pixel processor 88 may read from and write to the update buffer 80 via data path "C." In a display update operation, the update pipe sequencer 90 may read from the update buffer 80 via data path "D."

The image buffer 78 may be used to store a frame of data pixels. The update buffer 80 may be used to store synthesized pixels. In one embodiment, a "synthesized pixel" is a data structure or a data record that defines a pixel transition. A synthesized pixel may include data defining a current display state and a next display state. A synthesized pixel may additionally include an identifier of an assigned update pipe 84.

The host 22 may store a full frame of data pixels or a portion of a frame of data pixels in the image buffer 78 using data path A. Alternatively, another unit of the system 20 or the display controller 28 may store one or more data pixels in the image buffer 78. Data pixels may be stored while a pixel synthesis operation, a display output operation, or both are in progress. The pixel processor 88 may include an operability to generate synthesized pixels. The pixel processor 88 may read a data pixel stored in the image buffer 78 to obtain data defining a next display state of a display pixel 40 using data path B. In one embodiment, the pixel processor 88 may read a synthesized pixel stored in the update buffer 80 to obtain data defining a current display state of a display pixel 40. The pixel processor 88 may read the synthesized pixel using data path C. The pixel processor 88 may use the data pixel obtained from the image buffer 78 and a synthesized pixel obtained from the update buffer 80 to generate a new synthesized pixel. The pixel processor 88 may store synthesized pixels that it generates in the update buffer 80 using data path C. The storing of a synthesized pixel in the update buffer 80 by the pixel processor 88 may overwrite a previously stored synthesized pixel. The update pipe sequencer 90 may fetch synthesized pixels from the update buffer 80 using data path D.

After data pixels 40 defining an image have been stored in the image buffer 78, a display update operation may be performed. A display update operation may be performed as a result of a display update command being sent, transmitted, or communicated to the display controller 28. The display update command may be sent by the host 22, by another device, or may be generated internally by the display controller 28. Generally, a display update command causes the display states of the display pixels 40 of the display matrix 26 to be updated. In response to the display update command, the display controller 28 performs: (a) a pixel synthesis operation; and (b) a display output operation.

Figure 8:
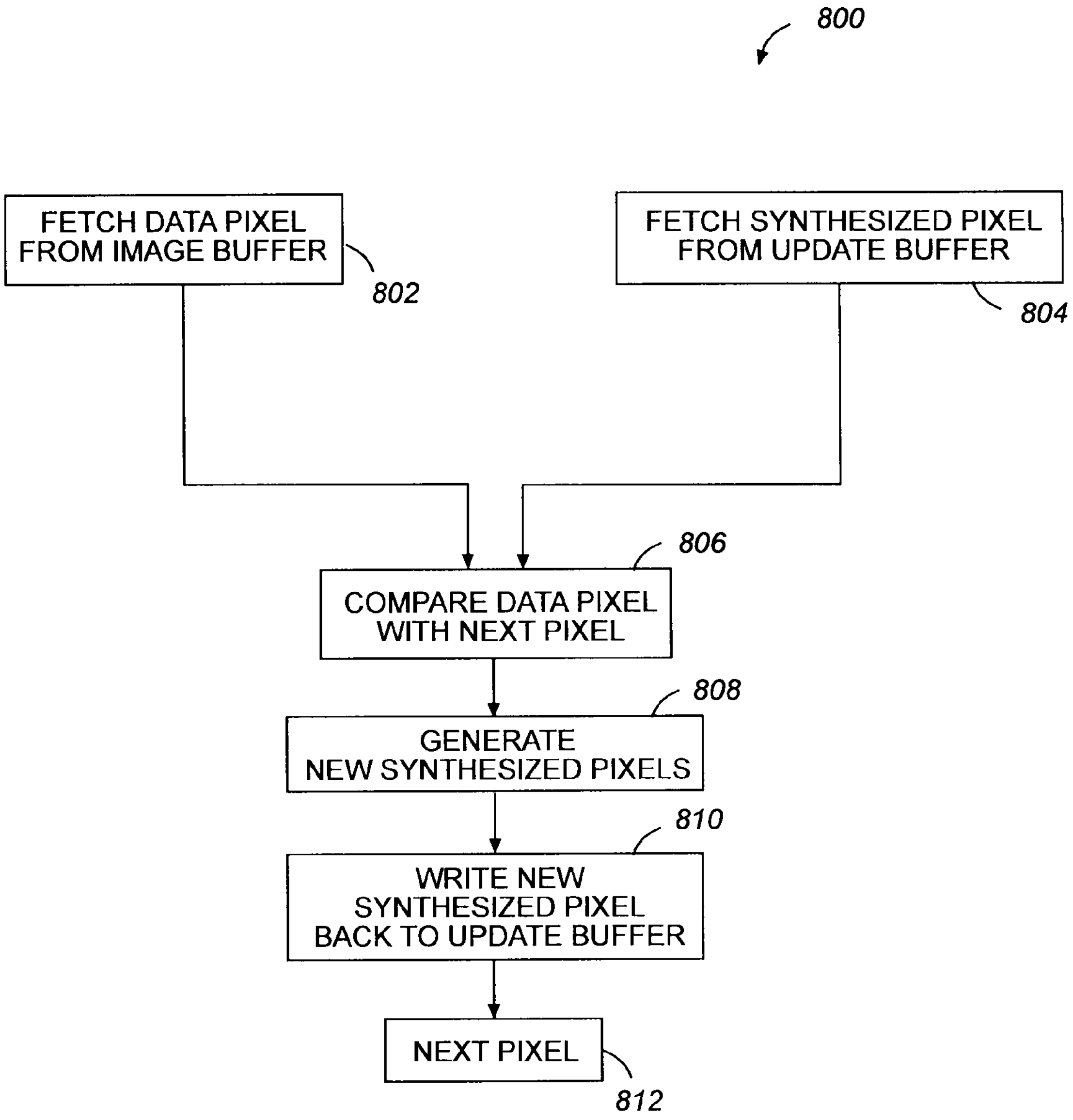
FIG. 8 is a flow diagram illustrating a pixel synthesis operation according to one embodiment.

FIG. 8 is a flow diagram illustrating a pixel synthesis operation 800 according to one embodiment. In one embodiment, the pixel synthesis operation 800 may be performed by the pixel processor 88. In an operation 802, a data pixel is read or fetched from the image buffer 78. Data pixels may be read from the image buffer 78 in raster order beginning with the data pixel 40 in the upper left corner of the display matrix 26 according to one embodiment. In an operation 804, a synthesized pixel is read or fetched from the update buffer 80. Synthesized pixels may be read from the update buffer 80 in raster order beginning with the synthesized pixel corresponding with the data pixel in the upper left corner of the display matrix 26 according to one embodiment. The operation 802 may be performed prior to the operation 804, the operation 804 may be performed prior to the operation 802, or the operations 802 and 804 may be performed at the same time.

In operation 806, the fetched data pixel is compared with a next pixel value. The next pixel value is obtained from the synthesized pixel fetched in operation 804. A next pixel value is included in the data structure of each synthesized pixel and represents the current display state of a corresponding display pixel. Operation 806 compares the data pixel and the next pixel value to determine if they are equal. If the values are equal, i.e., the next and current display states are identical, then the corresponding display pixel is not marked for updating. On the other hand, if the values differ, i.e., the next and current display states differ, then the corresponding display pixel is marked for updating.

In operation 808, a new synthesized pixel may be formed or generated. If the display pixel was not marked for updating in operation 806, a new synthesized pixel need not be formed. If the display pixel was marked for updating, the next pixel value obtained from the fetched synthesized pixel (operation 804) is set as the current pixel value in the new synthesized pixel. The value of the fetched data pixel (operation 802) is set as the next pixel value in the new synthesized pixel. In operation 810, the new synthesized pixel is written back to the update buffer 80. As indicated by operation 812, the pixel synthesis operation 800 repeats operations 802-810 for each pixel location in the display matrix 26 according to one embodiment.

Referring again to FIGS. 6 and 7, the update pipe sequencer 90 may include an operability to perform one of the functions required in a display output operation. The update pipe sequencer 90 may fetch synthesized pixels from the update buffer 80 using data path D. The update pipe sequencer 90 may fetch synthesized pixels in raster order. The update pipe sequencer 90 may provide a synthesized pixel that it fetches to one of the update pipes 84. The update pipe sequencer 90 may determine which update pipe 84 to provide the synthesized pixel to by inspecting an update pipe identifier included in the synthesized pixel data structure.

In one embodiment, an update pipe 84 locates a drive scheme stored in the waveform memory 34 corresponding with a designated update mode and a current temperature. For each drive frame in the waveform period, the update pipe 84 copies all possible drive pulses for the drive scheme for the current drive frame and stores the current drive frame pulses in a lookup table associated with the update pipe. The update pipe 84 uses the current and next display states of a synthesized pixel to locate drive pulse data in the lookup table and stores the pulse data in a first-in-first-out memory ("FIFO") memory, which may be included within the update pipe. The FIFO memory is provided so that pulse data may be generated and buffered ahead of when it will be needed by the timing generation unit 86. The FIFO may be provided with one or more status flags that indicate the amount of drive pulse data present in the FIFO, e.g., full, half full, empty, etc.

The timing generation unit 86 includes an input that is coupled with the outputs of the update pipes 84. The timing generation unit 86 receives waveform data from the update pipes 84. The timing generation unit 86 provides waveform data to the display power module 38 and the display device 24 according to the timing requirements of the display device 24.

Two operations that may be performed by the display controller 28 are (a) a full display update, and (b) a partial display update. A full display update may cause a display state change for any of the display pixels 40 of the display matrix 26. A partial display update may cause a display state change for any of the display pixels 40 of a submatrix 52. A full display update may cause a display state change for all of the display pixels 40, and a partial display update may cause a display state change for all of the display pixels 40 of a submatrix 52. However, it is not required that all of the display pixels undergo a display state change. With either type of display update, there may be display pixels within the update region, i.e., within either the display matrix 26 or the submatrix 52, that do not have their display state changed.

Figure 9:
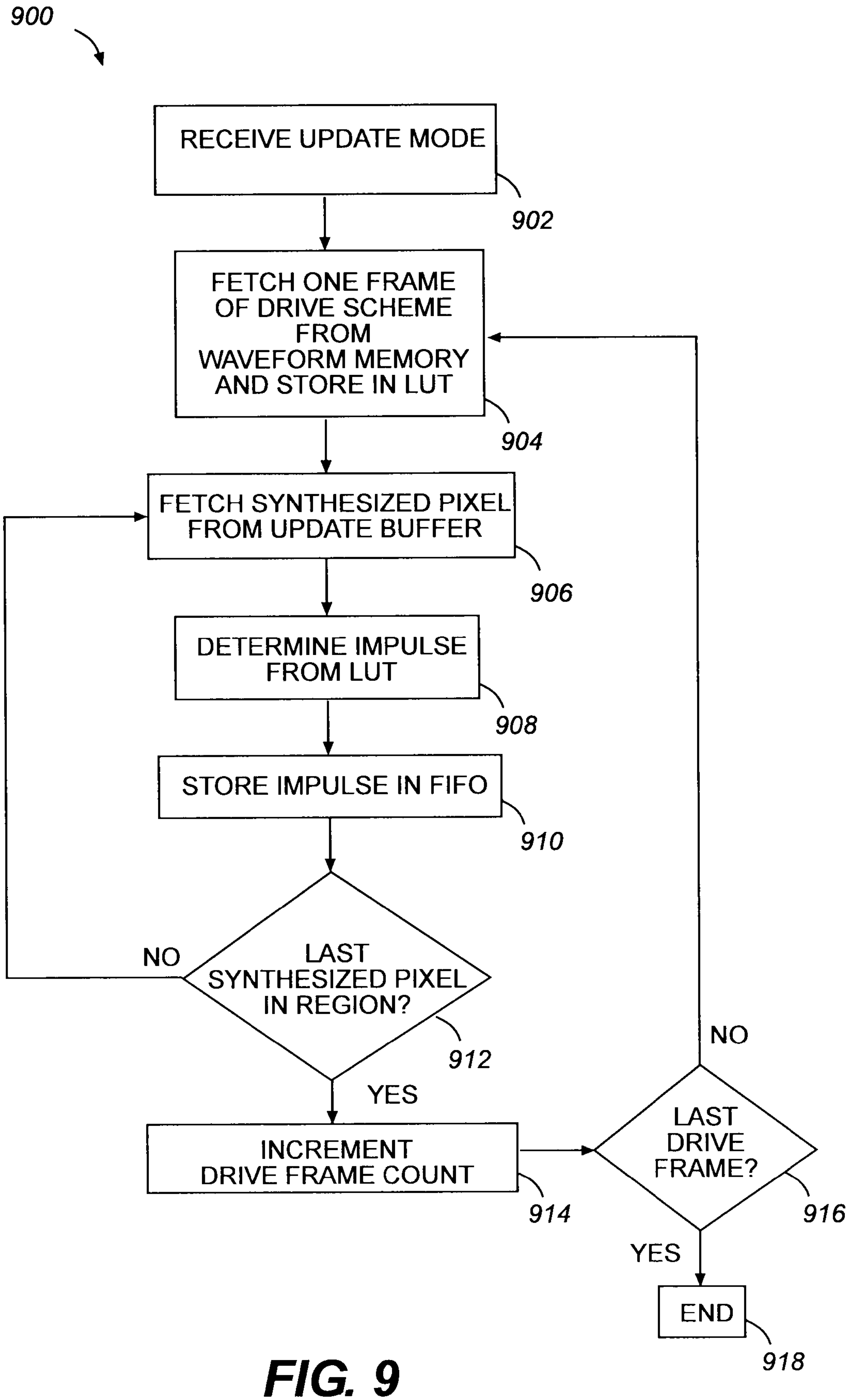
FIG. 9 is a flow diagram illustrating a display output operation according to one embodiment.

FIG. 9 is a flow diagram illustrating a display output operation according to one embodiment. In an operation 902, an update mode or drive scheme is received. In operation 904, one drive frame of the corresponding drive scheme is fetched from the waveform memory 34. Drive pulses for the current drive frame period may be stored in a lookup table ("LUT"). In operation 906, a synthesized pixel is fetched from the update buffer 80. Synthesized pixels of the display matrix 26 may be fetched from the update buffer 80 in raster order. In one embodiment, synthesized pixels of a submatrix 26 may be fetched in raster order. In operation 908, a drive impulse is determined for the fetched synthesized pixel. The drive impulse may be determined using the lookup table. In operation 910, the drive impulse may be stored in a FIFO memory that may be provided within an update pipe 84. In operation 912, a determination is made if the current synthesized pixel corresponds with the last pixel location in the update region. The update region may be the display matrix 26 or the submatrix 52. If not the last pixel location, steps 906-910 are repeated for each additional synthesized pixel in the update region. If the current synthesized pixel is the last synthesized pixel, a drive frame count is incremented in operation 914. In operation 916, a determination is made whether the current drive frame is the last drive frame in the drive scheme. If not the last drive frame period, steps 904-910 are repeated for each remaining drive frame period of the drive scheme.

Figure 10:
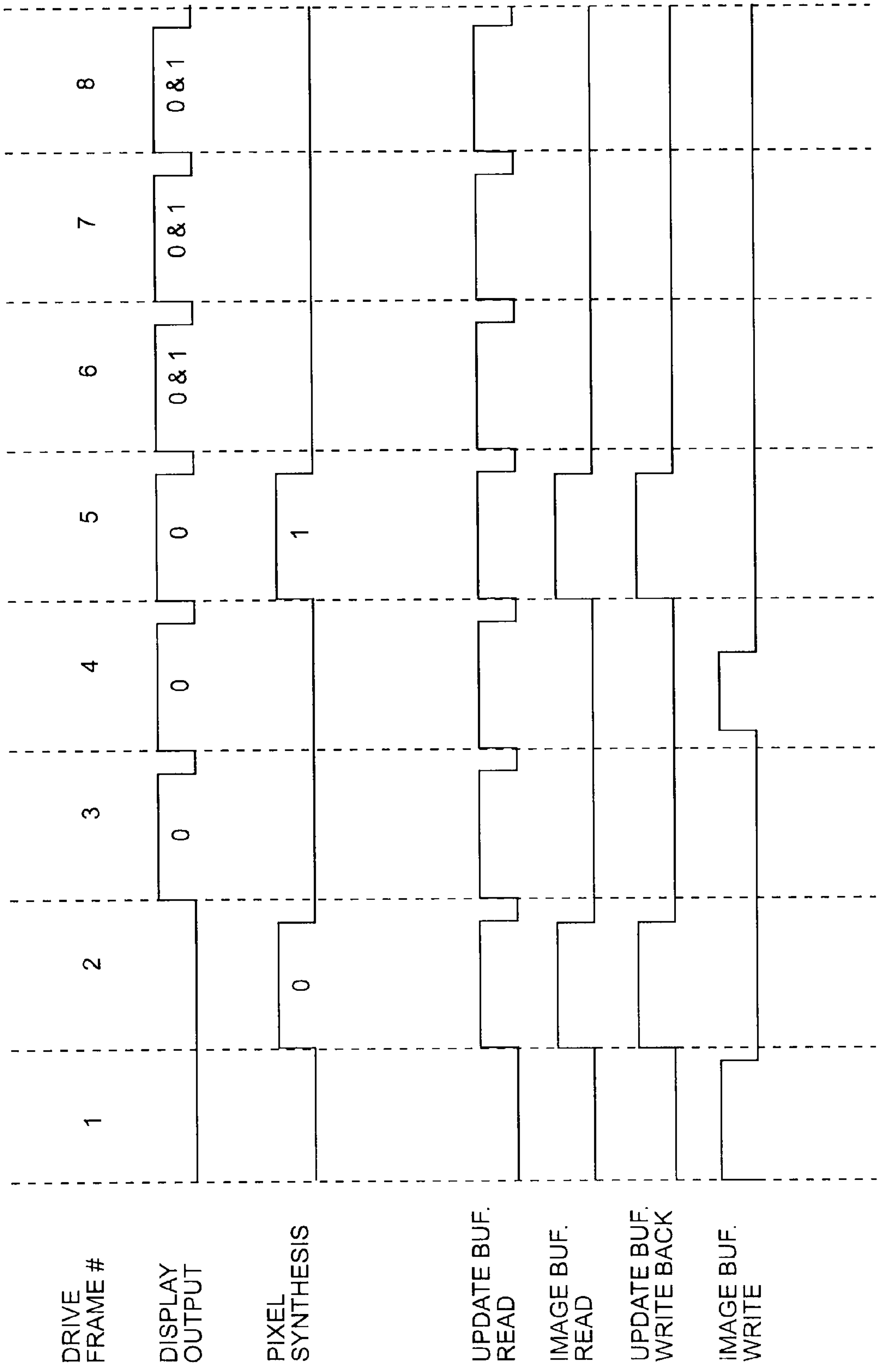
FIG. 10 is a timing diagram illustrating exemplary waveforms for a display output and pixel synthesis operations according to one embodiment.

FIG. 10 is a timing diagram illustrating exemplary waveforms for display output and pixel synthesis operations. FIG. 10 also illustrates the memory accesses associated with a display output operation (update buffer read) and with a pixel synthesis operation (image buffer read, update buffer read, update buffer write back). In addition, FIG. 10 also illustrates host memory accesses (image buffer write). FIG. 10 shows eight exemplary drive frame periods.

During drive frame 1, data pixels of a first region are written to the image buffer 78 and an update display command is received. An update pipe 0 may be assigned to the first region. During drive frame 2, a pixel synthesis operation is performed for the first region of display pixels. During the pixel synthesis operation, data pixels are read from the image buffer 78, synthesized pixels are read from the update buffer 80, and new synthesized pixels are written back to the update buffer 80. The pixel synthesis operation for region 0 completes within drive frame 2. In drive frame 3, a display output operation is begun using the synthesized pixels of the first region. During the display output operation, synthesized pixels are read from the update buffer 80.

During drive frame 4, data pixels of a second region are written to the image buffer 78 and an update display command is received. An update pipe 1 may be assigned to the second region. During drive frame 5, a pixel synthesis operation is performed for the second region of display pixels. During the pixel synthesis operation, data pixels are read from the image buffer 78, synthesized pixels are read from the update buffer 80, and new synthesized pixels are written back to the update buffer 80. In this example, the pixel synthesis operation for the second region completes within drive frame 5. In drive frame 6, a display output operation is begun for the synthesized pixels of the second region. In addition, in drive frame 6, the display output operation for the first region is continued. In other words, display output operations are performed for both the first and second regions using update pipes 0 & 1 in drive frame 6. During the display output operations synthesized pixels are read from the update buffer 80.

Drive frame period 5 shows that simultaneous pixel synthesis and display output operations may place significant demands on available memory bandwidth, e.g., drive frame 5. While the pixel synthesis was able to complete within a single drive frame even while a display output operation is in progress (drive frame 5) in this example, this may not always be possible. Under certain conditions, sufficient memory bandwidth may not be available for the display output operation to complete within a single drive frame, and this may be due to excessive use of available memory bandwidth by a pixel synthesis operation. Insufficient memory bandwidth is a problem because the display output operation must meet the minimum frame rate specified for the display panel 24. Moreover, as the number of display pixels included in a pixel synthesis operation increase, the demand on available memory bandwidth increases. Further, it can be difficult to predict how much memory bandwidth will be consumed by a pixel synthesis operation in any given drive frame. If the amount of memory bandwidth available in a drive frame is not sufficient to complete a display output operation, one or more display pixels will not be driven to the correct display state, resulting in image corruption.

Figure 11:
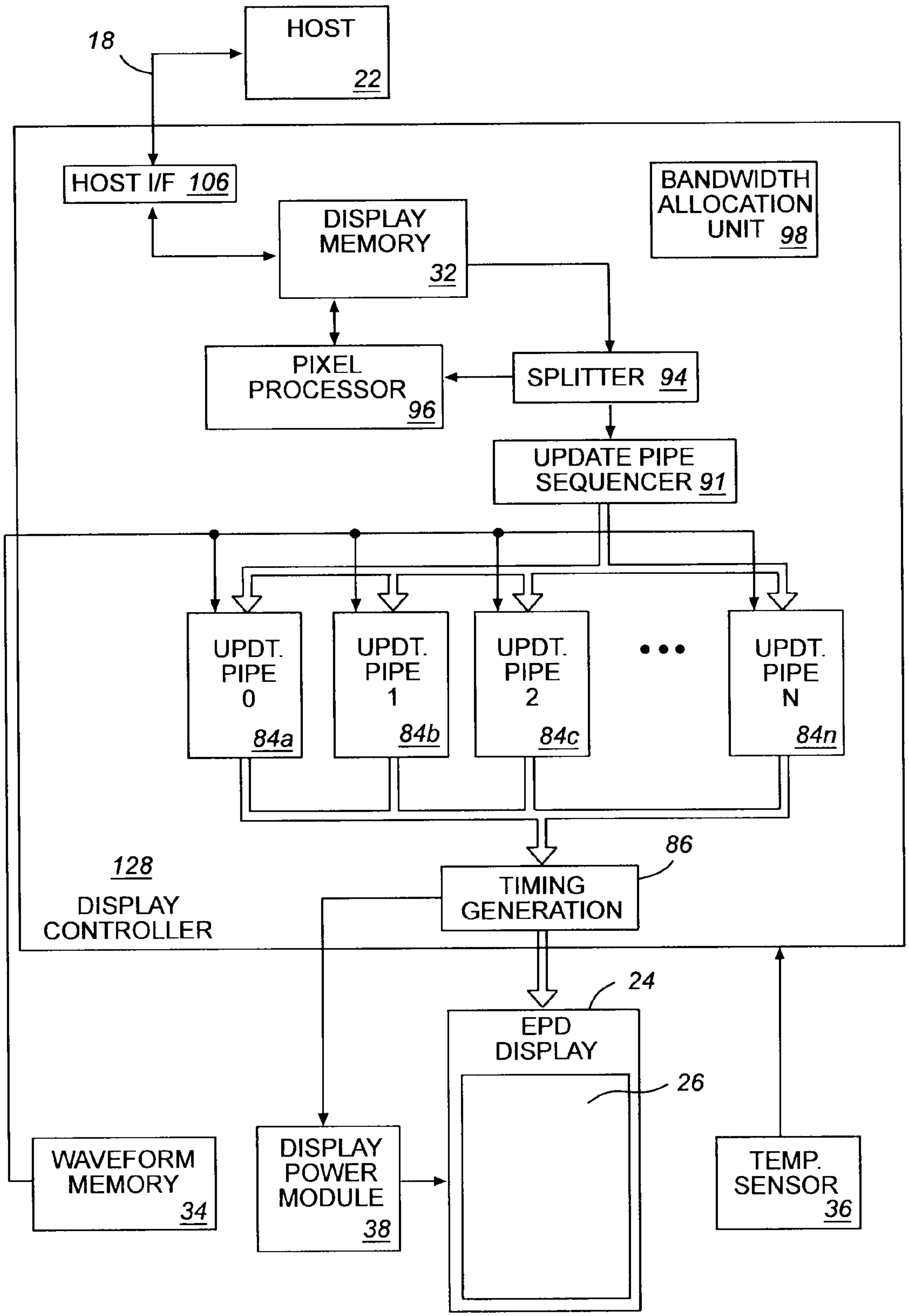
FIG. 11 is a block diagram of a display controller having an update pipe sequencer, a pixel processor, and a splitter, and a display memory according to one embodiment.

It would be desirable to increase the efficiency with which available memory bandwidth within a drive frame is used. FIG. 11 shows a display controller 128 and display memory 32 according to one embodiment. The display controller 128 operates in a manner which increases the efficiency with which available memory bandwidth is used.

Referring to FIG. 11, a block diagram of a display controller 128 according to one embodiment is shown. The display controller 128 may include the display memory 32, which includes the image buffer 78 and the update buffer 80. In the display controller 128, the image buffer 78 and the update buffer 80 serve the same functions as described above with respect to the display controller 28. The display controller 128 may also include one or more update pipes 84 and the timing generation unit 86, which serve the same functions as described above with respect to the display controller 28. In addition, the display controller 128 may include the update pipe sequencer 110, which serves the same function as described above.

The display controller 128 differs from the display controller 28 in that it may include a splitter 94, a pixel processor 96 in place of the pixel processor 88, an update pipe sequencer 91 in place of the update pipe sequencer 90, and a bandwidth monitor 98. In the display controller 128, the display memory 32 may be coupled with the host 22 via the host interface 106. In addition, the display memory 32 may be coupled with pixel processor 96 and the splitter 94. The splitter 94 may be coupled with pixel processor 96 and the update pipe sequencer 91.

In one embodiment, the splitter 94 and pixel processor 96 synchronously cooperate with the update pipe sequencer 91 to increase the efficiency with which available memory bandwidth is used. As described above, a display update operation, whether full or partial, includes a pixel synthesis operation and a display output operation. In a display output operation, the update pipe sequencer 91 fetches and provides synthesized pixels to one or more of the update pipes 84 in a series of drive frames. The pixel processor 96 performs pixel synthesis operations that are synchronized with the fetching of synthesized pixels by the sequencer 91. In one embodiment, the pixel processor 96 and the update pipe sequencer 91 share synthesized pixels fetched from the update buffer 80 using a data path D (shown in FIG. 12). In contrast, the pixel processor 88 and the update pipe sequencer 91, as configured in display controller 28, each independently fetch synthesized pixels from the update buffer 80 using data paths C and D (shown in FIG. 7), respectively.

Figure 12:
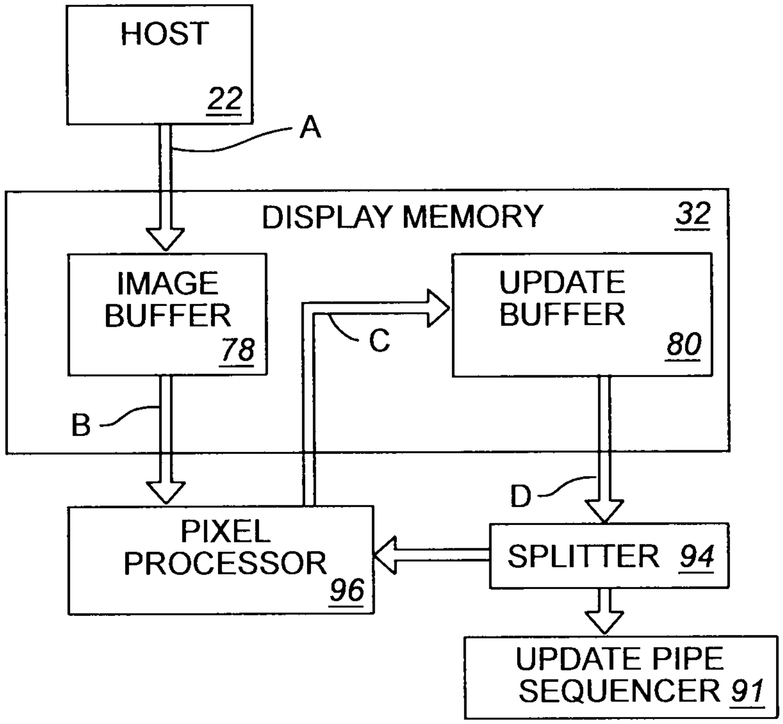
FIG. 12 is a block diagram showing the display memory of FIG. 11 and exemplary data paths according to one embodiment.

FIG. 12 is a block diagram showing the display memory 32, according to one embodiment, in greater detail, and exemplary data paths between the display memory 32 and the host 22, the pixel processor 96, splitter 94, and update pipe sequencer 91. In one embodiment, the display memory 32 includes an image buffer 78 and an update buffer 80. The host 22 may write to the image buffer 78 via data path "A." (Although not shown in FIG. 12, the host 22 may also read from the display memory 32.) In a pixel synthesis operation, the pixel processor 96 may read from the image buffer 78 via data path "B." In addition, the pixel processor 96 may write to the update buffer 80 via data path "C." In a display update operation, the update pipe sequencer 91 may read from the update buffer 80 via the splitter 94 on data path "D." Synthesized pixels read from the update buffer 80 on data path D may be provided to both the update pipe sequencer 91 and the pixel processor 96.

Figure 13:
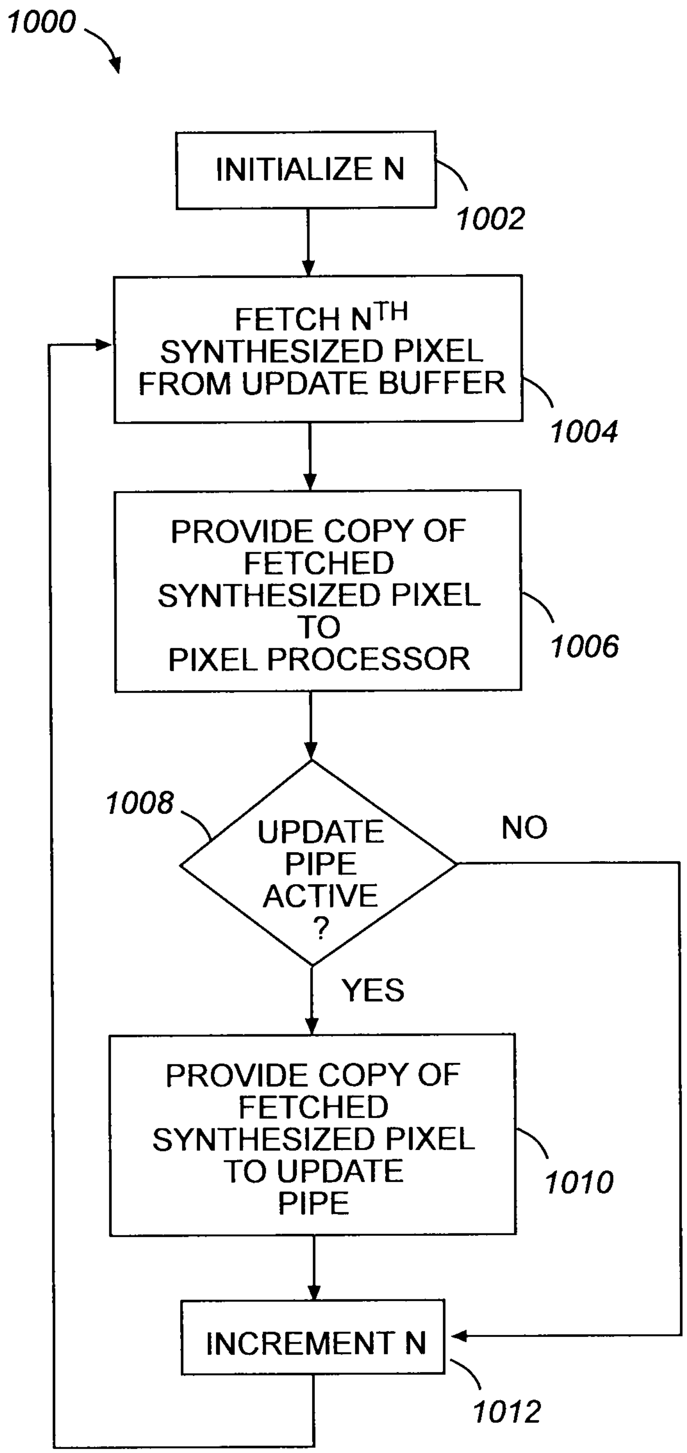
FIG. 13 is a flow diagram illustrating operation of the update pipe sequencer and splitter of the display controller of FIG. 11.

FIG. 13 is a flow diagram illustrating an operational flow 1000 of the update pipe sequencer 91 and splitter 94 of the display controller 128 according to one embodiment. In an operation 1002, a count "N" of the number of display pixels 40 in the display matrix 26 is initialized. In an operation 1004, a synthesized pixel corresponding with the current count N is fetched from the update buffer 80. In one embodiment, synthesized pixels are fetched in raster order, beginning with the left-most pixel in a top row. In an operation 1006, a copy of the fetched synthesized pixel is provided to the pixel processor 96 for use in a pixel synthesis operation. The operation 1006 may be performed by the splitter 94. In an operation 1008, the synthesized pixel may be inspected to determine if the update pipe 84 associated with the particular synthesized pixel is active. If the update pipe 84 is active, a waveform is currently being applied to the display pixel and the display pixel is currently transitioning from a first to a second display state. If the update pipe 84 is not active, the last waveform applied to the display pixel has finished and the display pixel is in its current display state. An operation 1010 is performed if the update pipe 84 is active. In the operation 1010, a copy of the synthesized pixel is provided to the update pipe 84 identified in an operation 1008 for use in one drive frame of a display output operation. If the update pipe 84 is active, the count N is incremented after operation 1010 in operation 1012. On the other hand, if the update pipe 84 is not active, the count N is incremented after operation 1008 in operation 1012. The operations 1002-1012 are repeated until all of the display pixels 40 in the display matrix 26 have been fetched.

Figure 14:
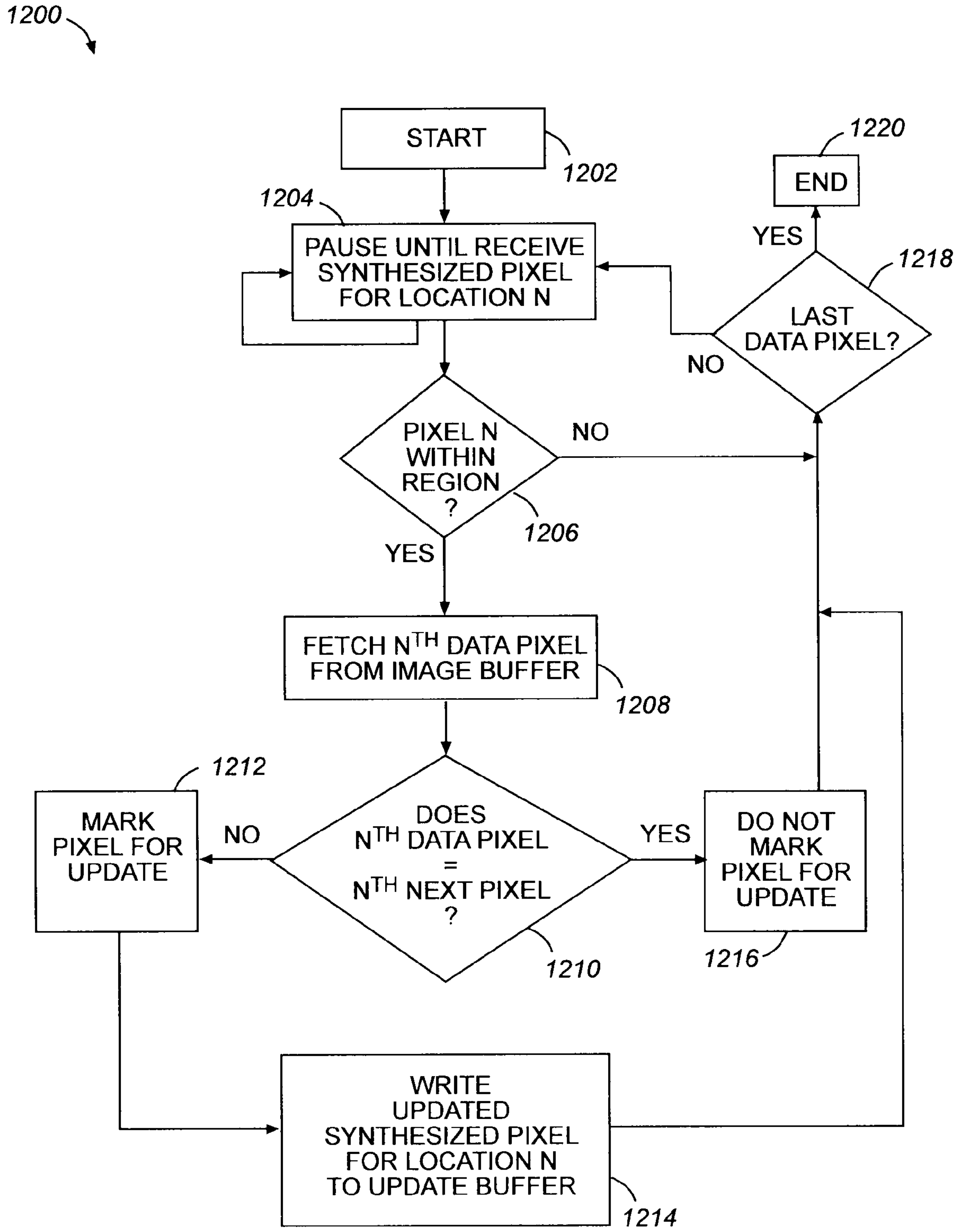
FIG. 14 is a flow diagram illustrating operation of the pixel processor of the display controller of FIG. 11.

FIG. 14 is a flow diagram illustrating operational flow 1200 of the pixel processor 96 of the display controller 128. In an operation 1202, a pixel synthesis operation starts or is initiated for a particular region of display pixels 40. In one embodiment, the pixel synthesis operation starts or is initiated synchronously with the start or initiation of a display output operation. The region may be the full display matrix 26 or one or more submatrices 52. In an operation 1204, the pixel processor 96 pauses until it receives a synthesized pixel from the splitter 94, which was fetched from the update buffer by the update pipe sequencer 91. As mentioned, synthesized pixels may be fetched in raster order by the update pipe sequencer 91, each fetched synthesized pixel being associated with a count N. In one embodiment, the pixel processor 96 receives a synthesized pixel N synchronously with the receipt of the synthesized pixel N by the update pipe sequencer 91. When the pixel processor 96 receives a synthesized pixel N, the flow proceeds to operation 1206. In operation 1206, it is determined whether the synthesized pixel N is within the particular region for which the pixel synthesis operation is being performed. If the synthesized pixel N is within the particular region, an operation 1208 is performed. In the operation 1208, a data pixel having the same display location as synthesized pixel N is fetched from the image buffer 78. In the operation 1210, the fetched data pixel is compared with the next pixel value. The next pixel value is included in the data structure of synthesized pixel N and represents the current display state of display pixel N. The display pixel is marked for update in operation 1212 if the fetched data pixel is not equal to the next pixel value. In other words, if the data pixel fetched from the image buffer 78 defines a display state that is different from the current display state, the display pixel is marked for update. In operation 1214, a new synthesized pixel is formed and written back to the update buffer 80. In the data structure of the new synthesized pixel, the next pixel value obtained from the synthesized pixel received in operation 1204 is set as the current pixel value of the new synthesized pixel. In addition, the value of the data pixel fetched from the image buffer 78 is set as the next pixel value of the new synthesized pixel. After the comparison in operation 1210, the display pixel is not marked for update in an operation 1216 if the fetched data pixel is equal to the next pixel value. In an operation 1218, it is determined if the current synthesized pixel N corresponds with the last data pixel within the particular region for which the pixel synthesis operation is being performed. The operation 1218 may be performed after operation 1214, 1218, or after a negative result in operation 1206. The operations 1204-1218 may be repeated until pixel synthesis has been performed for all of the data pixels within the particular region. The operational flow 1200 increases the efficiency with which available memory bandwidth is used within a drive frame.

In addition to increasing the efficiency with which available memory bandwidth is used within a drive frame, it would be desirable to allocate the available memory bandwidth in a drive frame so that sufficient memory bandwidth is available to complete a display output operation. If a pixel synthesis operation is requested during a drive frame in which a display output operation is also being performed, additional demand is placed on available memory bandwidth. If the pixel synthesis operation is for a large region of data pixels, the memory access demand can be substantial. In addition if the host 22 performs a write to or a read from the image buffer 78 during the drive frame, the demand on available memory display memory bandwidth can increase even further. In one embodiment, the display controller 128 is operable to allocate the available memory bandwidth within a drive frame so that sufficient bandwidth is available to complete a display output operation.

In one embodiment, the bandwidth allocation unit 98 of the display controller 128 allocates the available memory bandwidth in a drive frame so that sufficient bandwidth is available to complete a display output operation. The display output operation includes reading all of the synthesized pixels in the update buffer 80 in raster order. In one embodiment, the update pipe sequencer 91 includes a FIFO (first-in-first-out) memory or other suitable memory (not shown). The update pipe sequencer 91 may fetch groups of synthesized pixels in burst memory accesses and buffer the groups in the update pipe sequencer's FIFO memory. Synthesized pixels may then be distributed from the sequencer FIFO to one or more active update pipes 84. Each of the active update pipes 84 buffers drive pulses associated with each synthesized pixel in a FIFO memory within the update pipe 84. The timing generation unit 86 causes drive pulses to be transferred from the active update pipes 84 and to the display device 26 in accordance with the display device timing requirements. In one embodiment, the bandwidth allocation unit 98 monitors the fullness of the FIFO memory included in the update pipe sequencer 91. If the fullness of the FIFO falls below a threshold, the bandwidth allocation unit 98 pauses a pixel synthesis operation. Otherwise, the pixel synthesis operation is not paused. The threshold may be ¾ empty, ½ empty, ¼ empty, or any other suitable level of emptiness or fullness.

Once the FIFO in the update pipe sequencer 91 falls below the threshold, the pixel synthesis operation may be paused for the remainder of the current drive frame. In one embodiment, in addition to pausing the pixel synthesis operation, other memory accesses, such as a read or write by the host 22, are held off for the remainder of the current drive frame. In one alternative embodiment, other memory accesses may be held off until the FIFO in the update pipe sequencer 91 has been filled above the threshold.

Figure 15:
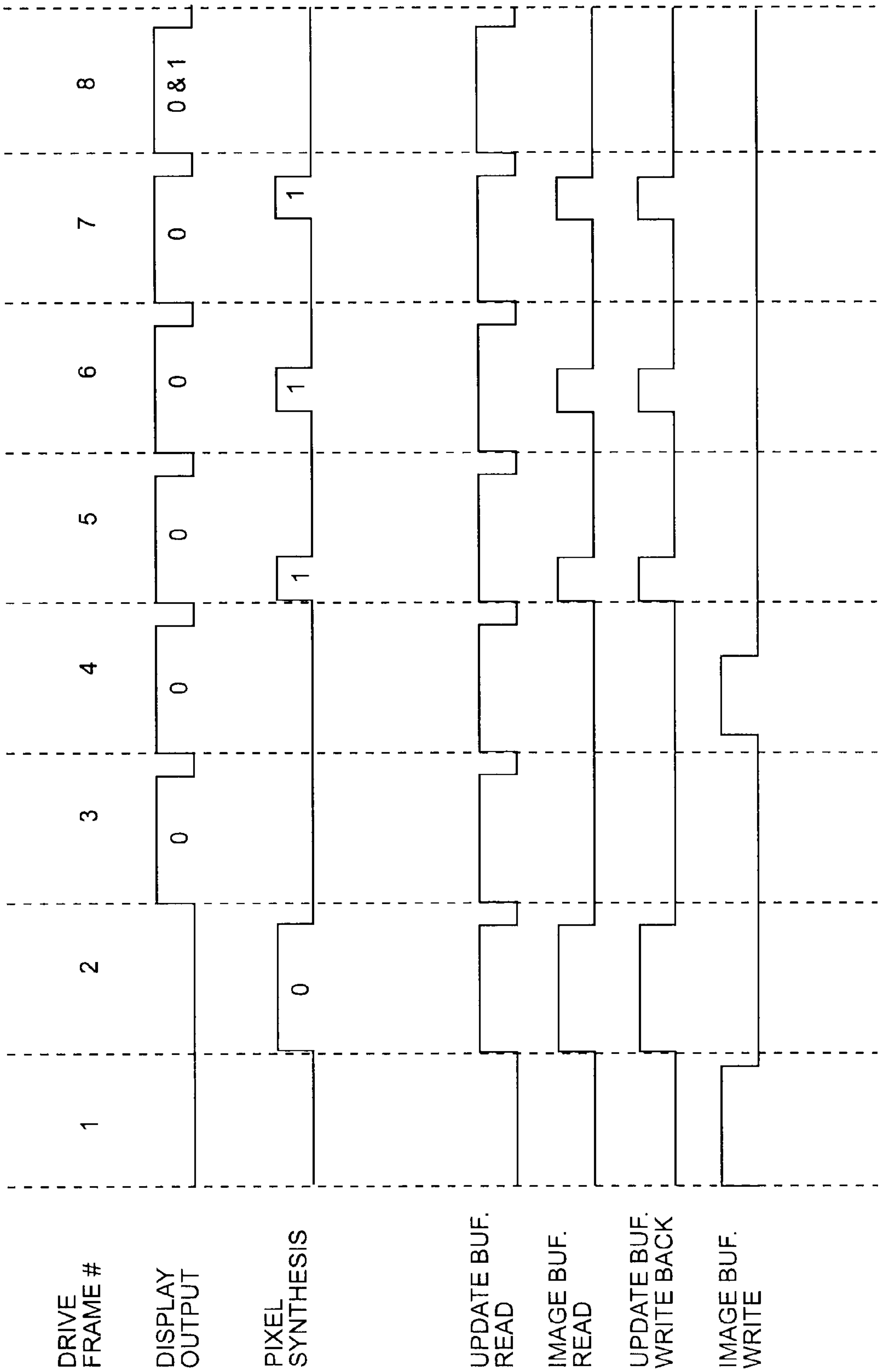
FIG. 15 is a timing diagram illustrating exemplary waveforms for display output and pixel synthesis operations according to one embodiment.

FIG. 15 is a timing diagram illustrating exemplary waveforms for display output and pixel synthesis operations according to one embodiment. FIG. 15 also illustrates memory access operations associated with display output (update buffer read). Furthermore, FIG. 15 illustrates memory access operations associated with pixel synthesis operations. In one embodiment, memory access operations associated with pixel synthesis operations include image buffer read, update buffer read, and update buffer write back. In an alternative embodiment, memory access operations associated with pixel synthesis operations include image buffer read and update buffer write back. In addition, FIG. 15 also illustrates host memory write operations (image buffer write). FIG. 15 shows eight exemplary drive frame periods.

During drive frame 1, data pixels of a first region are written to the image buffer 78 and an update display command is received. An update pipe 0 may be assigned to the first region. During drive frame 2, a pixel synthesis operation is performed for a first region. During the pixel synthesis operation, data pixels are read from the image buffer 78, synthesized pixels may be read from the update buffer 80, and new synthesized pixels are written back to the update buffer 80. The pixel synthesis operation 0 completes in drive frame 2. In drive frame 3, a display update operation is begun using the synthesized pixels of the first region. During the display update operation synthesized pixels are read from the update buffer 80.

During drive frame 4, data pixels of a second region of display pixels are written to the image buffer 78 and a display image command is received. An update pipe 1 may be assigned to the second region. During drive frame 5, a pixel synthesis operation for the second region is begun. In this example, the bandwidth allocation unit 98 determines that there is a predetermined probability that the display output operation will not complete within the drive frame period. The bandwidth allocation unit 98 may determine the probability that the display output operation will not complete based on the level of fullness of the update pipe sequencer's FIFO, the amount of memory bandwidth available in a drive frame, and the amount of elapsed time within a drive frame. The bandwidth allocation unit 98 pauses the pixel synthesis operation, which may include pausing the reading of data pixels from the image buffer 78 and pausing the writing back of synthesized pixels to the update buffer 80. In addition, other memory access operations may be paused or held off. Only the display output operation continues. In other words, only the reading of synthesized pixels from the update buffer 80 is allowed to continue after the other memory access operations are paused. Because other memory access operations are paused, the fetching of synthesized pixels for the display output operation complete within the drive frame period 5.

The pixel synthesis operation for the second region resumes in drive frame 6. The pixel processor 96 keeps track of the location in the second region where pixel synthesis was paused in drive frame 5 and starts from this location in drive frame 6. In addition, in drive frame 6, the display output operation for the first region is continued. In this example, the bandwidth allocation unit 98 again determines that there is a predetermined probability that the display output operation will not complete within drive frame period 6. Accordingly, the bandwidth allocation unit 98 pauses the pixel synthesis operations of reading of data pixels and writing back of synthesized pixels to the display memory 32. Because other memory access operations are paused, the fetching of synthesized pixels complete within drive frame period 6.

The pixel synthesis operation for the second region resumes in drive frame 7. The pixel processor 96 keeps track of the location in the second region where pixel synthesis was paused in drive frame 6 and starts from this location in drive frame 7. In addition, in drive frame 7, the display output operation for the first region is continued. In this example, the pixel synthesis operation for the second region completes in drive frame 7. The display output operation for the first region is continued in drive frame 8. In addition, a display output operation for the second region is started for the second region.

FIG. 15 illustrates how available memory bandwidth may be allocated between a display output operation for a first region and a pixel synthesis operation for a second region. FIG. 15 shows that when it is predicted that remaining memory bandwidth will soon be insufficient to complete the display output operation for the first region within the display frame period, the pixel synthesis for the second region is paused. FIG. 15 also shows that the pixel synthesis may be resumed and completed over additional successive display frame periods. The effect of the bandwidth allocation shown in FIG. 15 is that each of the display output operations for the first region are able to complete within a drive frame period. This allows display pixels to correctly transition to a new display state.

In one embodiment, some or all of the operations and methods described in this description may be performed by hardware, software, or by a combination of hardware and software.

In one embodiment, some or all of the operations and methods described in this description may be performed by executing instructions that are stored in or on a computer-readable medium. The term "computer-readable medium" may include, but is not limited to, non-volatile memories, such as EPROMs, EEPROMs, ROMs, floppy disks, hard disks, flash memory, and optical media such as CD-ROMs and DVDs.

In this description, references may be made to "one embodiment" or "an embodiment." These references mean that a particular feature, structure, or characteristic described in connection with the embodiment is included in at least one embodiment of the claimed inventions. Thus, the phrases "in one embodiment" or "an embodiment" in various places are not necessarily all referring to the same embodiment. Furthermore, particular features, structures, or characteristics may be combined in one or more embodiments.

Although embodiments have been described in some detail for purposes of clarity of understanding, it will be apparent that certain changes and modifications may be practiced within the scope of the appended claims. Accordingly, the described embodiments are to be considered as illustrative and not restrictive, and the claimed inventions are not to be limited to the details given herein, but may be modified within the scope and equivalents of the appended claims. Further, the terms and expressions which have been employed in the foregoing specification are used as terms of description and not of limitation, and there is no intention in the use of such terms and expressions to exclude equivalents of the features shown and described or portions thereof, it being recognized that the scope of the inventions are defined and limited only by the claims which follow.

What is claimed is:

1. A method for generating synthesized pixels, comprising: during a current drive frame period of a plurality of drive frame periods for writing to an image pixel of a display device:

(a) actuating the fetching of one of a plurality of existing synthesized pixels stored in an update buffer, each existing synthesized pixel corresponding to an image pixel of the display device, each existing synthesized pixel having a data structure including the current display state of its corresponding image pixel and the immediately previous display state of its corresponding image pixel;

(b) actuating the fetching of one or more data pixels from an image buffer, each data pixel corresponding to an image pixel of the display device, each data pixel specifying a next display state to replace the current display state of its corresponding image pixel;

(c) actuating the generating of a new synthesized pixel for each fetched data pixel and the storing of the generated new synthesized pixel in said update buffer, wherein each new synthesized pixel has a data structure including the next display state for a corresponding image pixel as specified by the image pixel's corresponding data pixel and including the current display state of the corresponding image pixel as specified by the image pixel's corresponding existing synthesized pixel; and (d) pausing the generating and storing of new synthesized pixels in response to a determination that its continued execution will prevent the display device's minimum frame rate from being maintained.

2. The method of claim 1, further comprising pausing the fetching of the data pixels from the image buffer in response to a determination that its continued execution will prevent the display device's minimum frame rate from being maintained.

3. The method of claim 1, wherein:

in (d), the generating and storing of new synthesized pixels is paused for the remainder of the current drive frame period; and returning to (a) in the next frame period following the current frame period of said plurality of drive frame periods.

4. The method of claim 1, further comprising ceasing all read and write accesses to the image buffer for a remainder of the current drive frame period in response to a determination that continued read and write accessed to the image buffer will prevent the display device's minimum frame rate from being maintained.

5. The method of claim 1, further comprising providing drive pulses corresponding with the existing synthesized pixels to the display device during the first drive frame period.

6. The method of claim 1, wherein the existing synthesized pixels and the data pixels are fetched synchronously.

7. The method of claim 1, wherein in (d), the determination that continued generating and storing of new synthesized pixels will prevent the display device's minimum frame rate from being maintained is based on monitoring the level of fullness of at least one buffer used to store drive pulse data for altering the display state of an image pixel.

8. The method of claim 1, wherein in (d), the determination that continued generating and storing of new synthesized pixels will prevent the display device's minimum frame rate from being maintained is based on monitoring the amount of memory bandwidth remaining in the first drive frame.

9. The method of claim 1, wherein in (d), the determination that continued generating and storing of new synthesized pixels will prevent the display device's minimum frame rate from being maintained is based on monitoring the elapsed amount of time in the first drive frame.

10. An apparatus, comprising:

a memory including an image buffer and an update buffer;

a first unit coupled to fetch existing synthesized pixels stored in the update buffer, each existing synthesized pixel corresponding to an image pixel of a display device, each existing synthesized pixel having a data structure including the current display state of its corresponding image pixel and the immediately previous display state of its corresponding image pixel;

a second unit coupled to fetch data pixels from the image buffer, each data pixel corresponding to an image pixel of the display device, each data pixel specifying a next display state to replace the current display state of its corresponding image pixel: and a control unit coupled to implement the following process steps:

during a current drive frame period of a plurality of drive frame periods for writing to an image pixel of said display device:

(a) actuating said first unit to fetch existing synthesized pixels from said update buffer;

(b) actuating said second unit to fetch data pixels from the image buffer;

(c) actuating the generating of a new synthesized pixel for each fetched data pixel that indicates a next display state for its corresponding image pixel and the storing the generated new synthesized pixels in the update buffer, wherein each new synthesized pixel has a data structure including the next display state for a corresponding image pixel as specified by the image pixel's corresponding data pixel and including the current display state of the corresponding image pixel as specified by the image pixel's corresponding existing synthesized pixel; and (d) pausing the generating and storing of new synthesized pixels in response to determining that its continued execution will prevent the display device's minimum frame rate from being maintained.

11. The apparatus of claim 10, wherein in step (d), the generating and storing of new synthesized pixels is paused for the remainder of the current drive frame period; and returning to step (a) in the next frame period following the current frame period of said plurality of drive frame periods.

12. The apparatus of claim 10, wherein said control unit is further coupled to cease all read and write accesses to the image buffer for a remainder of the current drive frame period in response to determining that continued read and write access to the image buffer will prevent the display device's minimum frame rate from being maintained.

13. The apparatus of claim 10, wherein the apparatus is coupled to actuate the applying of drive pulses corresponding to the existing synthesized pixels to the display device during the current drive frame period.

14. The apparatus of claim 10, wherein the first unit fetches existing synthesized pixels synchronously with the fetching of data pixels by the second unit.

15. The apparatus of claim 10, further comprising at least one buffer to store drive pulse data for altering the display state of an image pixel, wherein the determining that continued generating and storing of new synthesized pixels will prevent the display device's minimum frame rate from being maintained is based on monitoring the level of fullness of the at least one buffer.

16. A system, comprising:

a display device having display pixels that are updated from their current display state to their next display state in two or more drive frame periods;

a memory including an image buffer and an update buffer;

a first unit coupled to fetch all first synthesized pixels stored in the update buffer, each first synthesized pixel corresponding to an image pixel of the display device, each first synthesized pixel having a data structure including the current display state of its corresponding image pixel and the immediately previous display state of its corresponding image pixel;

a second unit to:

fetch one or more data pixels from the image buffer, the data pixels corresponding with pixel locations within a submatrix of a display matrix of the display device, each data pixel specifying the next display state of its corresponding image pixel:

generate one or more second synthesized pixels and store the generated second synthesized pixels in the update buffer each second synthesized pixel having a data structure including the next display state for a corresponding image pixel as specified by the image pixel's corresponding data pixel and including the current display state of the corresponding image pixel as specified by the image pixel's corresponding first synthesized pixel; and a third unit to predict whether the fetching all first synthesized pixels will not complete within a first drive frame period and to pause the generating and storing of the second synthesized pixels based on a prediction that the fetching all first synthesized pixels will not complete within a first drive frame period.

17. The system of claim 16, wherein the third unit is operable to resume the generating and storing of the second synthesized pixels in a second drive frame period subsequent to the first drive frame period.

18. The system of claim 16, wherein the first unit provides fetched first synthesized pixels to the second unit, the second unit generating second synthesized pixels based at least in part on data included in the fetched first synthesized pixels.

19. The method of claim 1, wherein in (a), wherein said actuating of the fetching of one of a plurality of existing synthesized pixels, actuates the fetching of all existing synthesized pixels within the current drive frame.

20. The apparatus of claim 10, wherein in step (a) the first unit is actuated to fetch all existing synthesized pixels from said update buffer.

* * * * *